Sept. 12, 1961 A. POLLAK 2,999,898

PULSE AND NOISE SEPARATORS

Filed Jan. 22, 1960 4 Sheets-Sheet 1

INVENTOR
Alfred Pollak

BY George H. Spencer

ATTORNEY

PULSE AND NOISE SEPARATORS

Filed Jan. 22, 1960 4 Sheets-Sheet 2

INVENTOR
Alfred Pollak
BY George B. Spencer
ATTORNEY

Sept. 12, 1961 A. POLLAK 2,999,898

PULSE AND NOISE SEPARATORS

Filed Jan. 22, 1960 4 Sheets-Sheet 3

INVENTOR
Alfred Pollak

BY George H. Spencer

ATTORNEY

Sept. 12, 1961 A. POLLAK 2,999,898

PULSE AND NOISE SEPARATORS

Filed Jan. 22, 1960 4 Sheets-Sheet 4

INVENTOR
Alfred Pollak

BY George H. Spencer

ATTORNEY

United States Patent Office 2,999,898

Patented Sept. 12, 1961

2,999,898

PULSE AND NOISE SEPARATORS

Alfred Pollak, Hannover, Germany, assignor to Telefunken G.m.b.H., Berlin, Germany Filed Jan. 22, 1960, Ser. No. 4,054
Claims priority, application Germany Jan. 23, 1959
7 Claims. (Cl. 178—7.3)

The present invention relates to an electrical circuit to separate pulses from signals containing various kinds of pulses and intelligence, particularly video signals, wherein pulses and intelligence appear in different amplitude ranges.

It is known in the art to feed continuous signals of this type to the control grid of an amplifier tube of a separator via an RC circuit, said amplifier tube having a small amplitude input range. The peaks of the pulses to be separated are thus clipped to a predetermined level by the drawing of grid current. The amplitude input range of the tube is usually made smaller than the height of the pulses to be separated, whereby only the pulses appear in the anode circuit of the separator tube (see, for example, German Patent No. 907,756). However, such a cricuit has the disadvantage that the time constant of the grid RC circuit cannot be dimensioned at optimum, due to another undesirable effect present in the input circuit. Other, somewhat similar circuits are known in the receiver art for noise suppression. Usually, all noise pulses exceeding the synch pulse level are separated from the video signals and later mixed in a multigrid tube with the video signals still containing the noise pulses, but the added noise pulses are of equal height and of opposite polarity. However, this tube draws grid current upon the occurrence of a strong noise pulse. Due to the fact that the multigrid tube operates with the audio effect, serving as a synch pulse separator, the noise pulses coming together with the video signals will be cancelled in the tube and cannot pass therethrough, but they also negatively bias the input capacitor in the grid circuit of the tube and may suppress the next succeeding synch pulse.

It is an object of the present invention to provide a new pulse separator for combined pulse and intelligence signals which separator operates without drawing grid current.

It is another object of the invention to provide a new pulse separator for combined pulse and intelligence signals in which the operating level is automatically adjusted to a predetermined level, for example, to the level of the synch pulse peak value in the television receiver circuit.

It is another object of the invention to provide a new noise separator for television video signals operating in synchronism with the line frequency but avoiding faulty operation in case the line oscillator goes out of step.

It is a further object of the invention to provide for a new synch pulse separator for television receivers.

It is a further object of the invention to provide for a new continuous noise and synch pulse separator in which the noise separator will not influence the synch pulse separator.

It is an additional object of the invention to provide for a new television pulse separator periodically activated in coincidence with the line oscillator.

According to one aspect of the invention, in an embodiment thereof, an electronic pulse separator is provided having a control grid, a screen grid and an anode, the latter being coupled to the control grid for the purpose of stabilizing the control grid current and the anode current to a preselected magnitude. The screen grid is connected to a positive constant bias via a resistor through which a current flows whenever the grid obtains a pulse, the amplitude of which exceeds the steady bias amplitudes at the grid. The tube is periodically activated.

In a preferred embodiment of the invention, the circuit is used for noise separation from video signals and is generally operated in coincidence with the line synchronizer. Whenever the synchronism fails, the transmission of the output of the noise separator to the noise suppression stage is blocked by means of cathode bias.

According to another embodiment of the invention, noise separation is produced in a tube having its operating point automatically adjusted so that only those noise pulses appear in its output circuit which exceed the synch pulse peak level. The cathode of the separator tube is activated by a coincidence circuit whenever there is substantial coincidence between the pulses produced in synchronism with the line oscillator and the input synch pulses for line synchronizing, whereby in case the synchronism fails, for example, due to an out-of-step operation of the line oscillator, the noise pulse separator tube is blocked.

In a still further embodiment of the invention the pulse separator is used for synch pulse separation.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
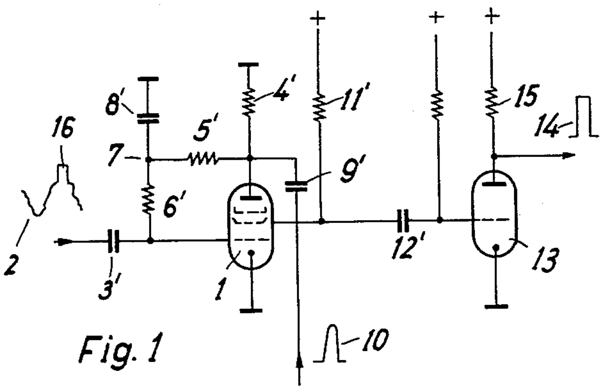
FIGURE 1 is a circuit diagram of an embodiment of the invention as used for synch pulse separation from the video signals in a television receiver circuit.

The pulse separator of a television receiver shown in FIGURE 1 comprises an amplifier tube 1 of the pentode type, having a control grid to which a video signal 2 is supplied via a capacitor 3'. Signal 2 contains also control pulses such as 16 which may, for example, be the synch pulses for the line oscillator (not shown). The anode of tube 1 is connected to ground via a resistor 4' and it is further connected to the grid via two resistors 5' and 6' having a common junction 7. This junction 7 is connected to ground by means of a smoothing capacitor 8'.

To periodically activate the tube 1, the anode is further connected via a capacitor 9' to a pulse source producing pulses 10. This source is not shown and it may, for example, be the line-deflection transformer for the video tube of the television receiver. At this transformer, a high voltage peak of short duration is produced during the return trace of the line deflection. Such a flyback peak duly rectified is suitable to serve as voltage pulse 10.

The screen grid of tube 1 is connected to a D.C. voltage supply source via a resistor 11′ and this screen grid is further connected to a control grid of another amplifier tube 13 via a capacitor 12′, which control grid is supplied with a positive voltage bias. Tube 13 in particular serves as pulse limiter and is connected to a D.C. voltage supply source via a resistor 15. The separated and limited control pulses 14 are taken from the anode of tube 13.

Figure 2:
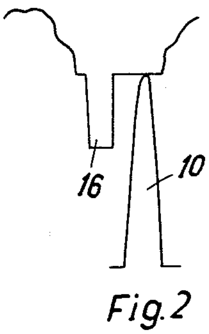
FIGURE 2 is a graphical diagram illustrating the phase position of a synch pulse to be separated and an activating pulse in the circuit shown in FIGURE 1.
Figure 3:
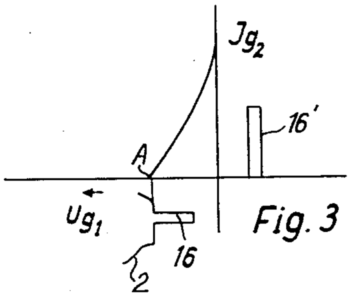
FIGURE 3 is a diagram for the screen-grid-circuit, control-grid voltage characteristic of the tube used in the circuit of FIGURE 1.

The mode of operation of the circuit shown in FIGURE 1 shall now be explained in connection with the diagrams of FIGURES 2 and 3. The video signals 2 including the control pulses are fed to the control grid of tube 1, causing a negligibly small anode current, due to the periodically produced positive anode voltage of pulses 10. The small anode current thus produced causes a negative voltage at the anode. Due to the resistive connection between the anode and the control grid of tube 1, the control grid thus obtains a negative feedback voltage stabilizing the signal level as activated by pulses 10 to a small anode current of, for example, 10 to 20 $\mu$ Amp. All portions of the signals 2 exceeding the thus established level produce in the screen grid current corresponding signals, but inversely polarized as compared with the input polarity at the grid, said signals appearing as a voltage drop across resistor 11′. Suppose pulses 16 are the synch pulses of the receiver, then the activating pulses 10 are phase shifted with respect to the synch pulses 16 to such a degree that they coincide with the black level of pulses 2, as shown in FIGURE 2. The synch pulses 16 are on the blacker-than-black level. Due to the coincidence of the activating pulses 10 with the black level of the video pulses, the black level of the video signals determines the stabilizing level of the anode current and is further determined by the position of the lower corner A of the screen grid circuit ($I_{g2}$)—control grid voltage ($U_{g1}$). Characteristics shown in FIGURE 3 are produced by the circuit of FIGURE 1. The video signals appear as more positive control grid voltage causing no screen current, but the synch pulses appear within the control range of this characteristic. The width of this control range is selected so as to approximately correspond to the amplitude of the synch pulses. The pulse 16′ then appears as a rectangular current pulse in resistor 11 or as a corresponding voltage drop thereacross. This pulse 16′ is then limited to form a pulse 14 by means of the tube 13 and its associated circuitry.

The circuit shown in FIGURE 1 has the advantage that no grid current in receiver tube 1 is necessary for this synch pulse separation.

Figure 4:
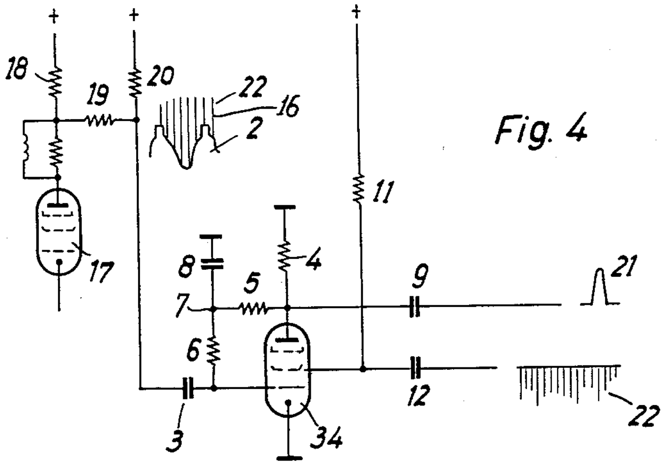
FIGURE 4 is a circuit diagram illustrating a noise separator employing the present novel circuit.

In FIGURE 4, an ohmic voltage divider comprising resistances 19 and 20 is connected in parallel with an anode resistance 18 of a receiver tube 17, the control grid of which is initially supplied with video signals containing the control pulses.

The junction of resistors 19 and 20 is connected to an amplifier tube 34 by means of a capacitor 3, said tube 34 corresponding to tube 1 in FIGURE 1. Elements 4′, 5′, 6′, 8′, 9′, 11′ and 12′ of FIGURE 1 correspond to elements 4, 5, 6, 8, 9, 11 and 12, respectively, of FIGURE 4, and the latter elements are connected to tube 34 in the same manner as the corresponding elements of FIGURE 1 are connected to tube 1 therein. The pulses now fed to capacitor 33 include also disturbance or noise pulses 22 which may exceed the blacker-than-black level of synch pulses 16. In this embodiment, the activating pulses 21 supplied to the anode of tube 34 via capacitor 9 are in phase with the synch pulses 16. Thus, at the screen grid end of resistor 11, only those noise pulses appear which exceed the synch pulse peak level.

Figure 5:
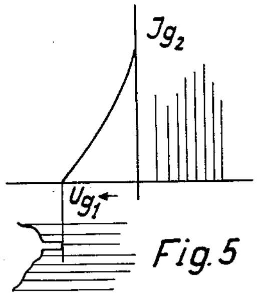
FIGURE 5 is a diagram having plotted the screen-grid-circuit, control-grid voltage characteristic of the tube used in the circuit of FIGURE 4.

The mode of operation of the circuit shown in FIGURE 4 shall be explained with reference to FIGURE 5. Upon the occurrence of video signals 2 including synch pulses 16 and noise pulses 22, a small anode current is produced in tube 34, due to the activating pulses 21 which, in this case, coincide with the synch pulses 16. The level to which tube 34 is stabilized corresponds to the blacker-than-black level of the synch pulses, because a negative voltage is produced at the anode, and due to the resistances 5 and 6 connecting anode and control grid of tube 34, this control grid obtains a negative feedback voltage, whereby the peaks of the synch pulses are stabilized to a very small anode current, for example, 10 to 20 $\mu$ Amp. The main purpose of the stabilization is, of course, to adjust resistors 4, 5 and 6, on the one hand, and to select the amplitudes of pulses 16 and 21 and their mutual phase position, on the other hand, to such a degree that the combined signals 21 and 16 do not produce any screen grid current. The height of pulses 16 is the upper limit thereof, while any pulse exceeding this level produces a screen grid current, the height of which is determined by resistor 11. In other words, the coincidence of activating pulses 21 with the peak of the control or synch pulse 16 determines the stabilized separation level of tube 34. Any signal, like the video signals or noise pulses below the synch pulse peak level do not appear as corresponding screen grid current, while all noise pulses exceeding the synch pulse peak level appear in the screen grid circuit as corresponding current.

Upon the occurrence of a noise pulse exceeding the peak level of the synch pulses, a current is produced in the screen grid circuit causing an inverse negative voltage drop across resistor 11. This is shown in FIGURE 5, illustrating the screen-grid-current, control-grid-voltage characteristics. Thus, the circuit shown in FIGURE 4 removes the noise pulses from the video signals.

Figure 6:
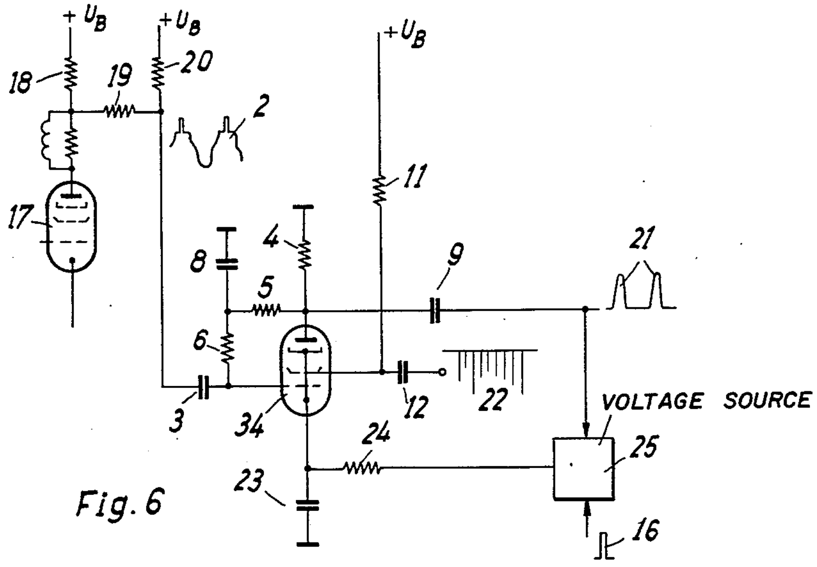
FIGURE 6 is an improvement of the circuit shown in FIGURE 4.

The circuit shown in FIGURE 6 is similar to the one shown in FIGURE 4, the only differences are that the cathode of tube 34 is not directly grounded but it biased. A capacitor 23 is connected between ground and cathode, and the cathode is connected to a voltage source 25 via a resistor 24. The output of voltage source 25 depends on proper coincidence of pulses 21 produced by a local oscillator and the synch pulses 16 as received. Upon coincidence of pulses 21 and 16, the output voltage of coincidence circuit 25 is high, while otherwise it is low. This provision ensures that tube 34 is activated only when the activator pulses 21 produced by a local oscillator coincide with the control pulses 16 as received.

Of course, the circuit described thus far may be used for the production of a fade control voltage, if, in addition to the video signals, the D.C. voltage corresponding to the fade control voltage were fed to the control grid of the amplifier tube 34. In this case, the negative feedback would have to be superimposed on the input signals.

Figure 7:
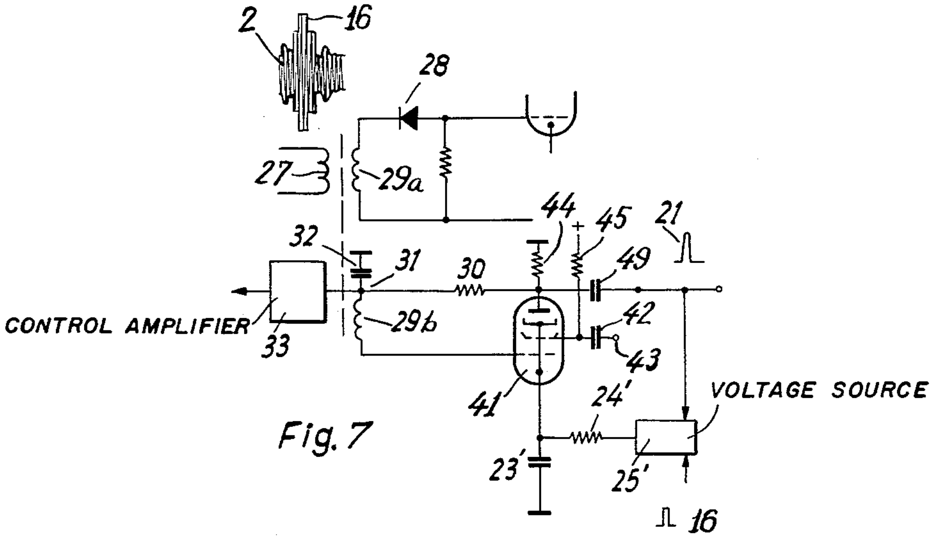
FIGURE 7 is a modification of the circuit shown in FIGURE 1.

Such circuit is shown in FIGURE 7. In this circuit, the intermediate frequency modulated by the video signals is fed to an input winding 27 of a transformer having two output windings **29*a* and 29*b*. The signals appearing across winding 29*a* are fed to a video signal demodulator 28 for further usage. The signals appearing across winding 29*b* are fed to the control grid of a tube 41, the anode of which is connected first to ground via a resistor 44, second to point 31 of winding 29*b* via a resistor 30, and third to an activating pulse source producing pulses 21 via a capacitor 49. Point 31 of winding 29*b* is grounded via capacitor 32 at the end of winding 29*b* remote from the control grid of tube 41. The screen grid of tube 41 is connected to a positive bias via a resistor 45 and to an output terminal 43 via a capacitor 42. Elements 23′, 24′ and 25′ correspond to elements 23, 24 and 25, respectively, in FIGURE 6 and serve to ensure activation of tube 41 by locally produced pulses 21 when in coincidence with the synch pulses 16**.

The general mode of operation of this circuit is the same as that shown in FIGURE 1 as far as separation of synch pulses is concerned. In FIGURE 1, there was an RC control-grid input with ohmic feedback, in FIGURE 7, the control grid has a transformer input and an RL feedback, but in both cases, a certain low anode current level is provided at the black level and only the synch pulses may effectively exceed this level, the resulting pulses appearing in FIGURE 7 across resistor 45, and then at output terminal 43. However, in addition to the device shown in FIGURE 1, the circuit of FIGURE 7 provides for the utilization of the voltage appearing at point 31 for automatic fade control or automatic gain control. The junction point 31, the potential of which follows the anode voltage of tube 41, is connected to a control amplifier 33. The output of amplifier 33 thus can be used for the A.G.C.

Figure 8:
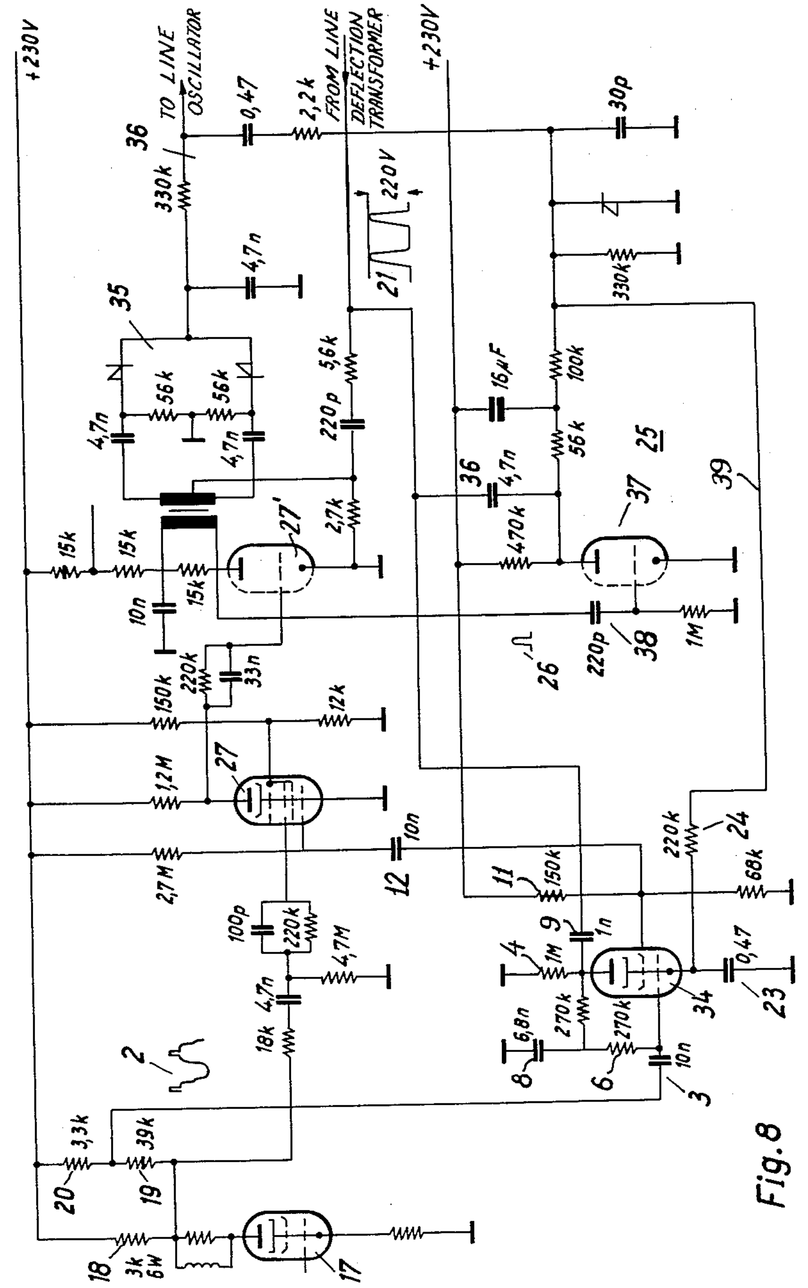
FIGURE 8 is a complete circuit diagram of a practical circuit according to the invention having incorporated the circuit shown in FIGURE 6.

FIGURE 8 is a complete circuit which has been used successfully and incorporates the principle of the invention. In particular, the embodiment shown in FIGURE 6 for noise separation is used therein and corresponding elements are denoted with similar reference numerals. It will be noted that in FIGURE 8 various elements are further identified by their values, such as have been found suitable for proper operation of this circuit. In this figure, *k* stands for kilo ohm, M for mega ohm, *p* for picofarad and *n* for nanofarad.

The video signals as amplified by tube 17 are fed to tube 34 exactly as shown already in FIGURE 6, but in addition are fed to the third control grid of a multi-grid tube 27 for synch pulse separation, operating according to the audio principle. The first control grid of tube 27 is supplied with a screen-grid output voltage from the noise separator tube 34. As a substitution, a separator circuit of the type drawing no grid current, of course, may be used. In other words, the synch pulse separator circuit with tube 27 could be replaced by a circuit as shown in FIGURE 1 or 7. In FIGURE 8, tube 27 is a synch pulse separator circuit of a type known per se. This separator circuit of tube 27 operates on the principle that a grid bias is applied such, that only those pulses exceeding approximately the black level cause an anode voltage variation. The output of separator tube 27 is fed to a limiter stage 27' and from there to a phase comparison circuit generally denoted by 35. The output voltage of circuit 35 is filtered by means of filter 36 and then is fed to the line oscillator (not shown) of the television receiver. Due to the separation of the noise pulses from the video control pulse signals with the aid of activator pulses, it could easily occur that the separated noise pulses block the synch separator 27 when the activation pulses 21 fail. In order to avoid this danger, a D.C. voltage is fed to the cathode of tube 34, the magnitude of which is determined between two levels by the coincidence circuit 25. This coincidence circuit includes a tube 37, the grid of which receives the separated synch pulses 16 from the limiter stage 27' via a capacitor 38; the anode of tube 37 receives the activating pulses 21 via a capacitor 36. Pulse 21 here also may be produced during flyback in the line deflection transformer. As long as these pulses coincide, tube 37 produces a negative voltage appearing in line 39 which is fed to the cathode of separator tube 34 to keep the latter open only for those noise pulses exceeding the synch pulse peaks. The same voltage appearing in line 39 is also fed to the line oscillator to damp the control circuit of the line oscillator to such a degree that, in case it gets out of step, it is returned into its pull-in range. In case the pulses of tube 37 do not coincide or one of them even fails to completely do so, the voltages appearing at line 39 and at the cathode of tube 34 block the latter and the synch separator tube 27 remains unblocked.

Figure 9:
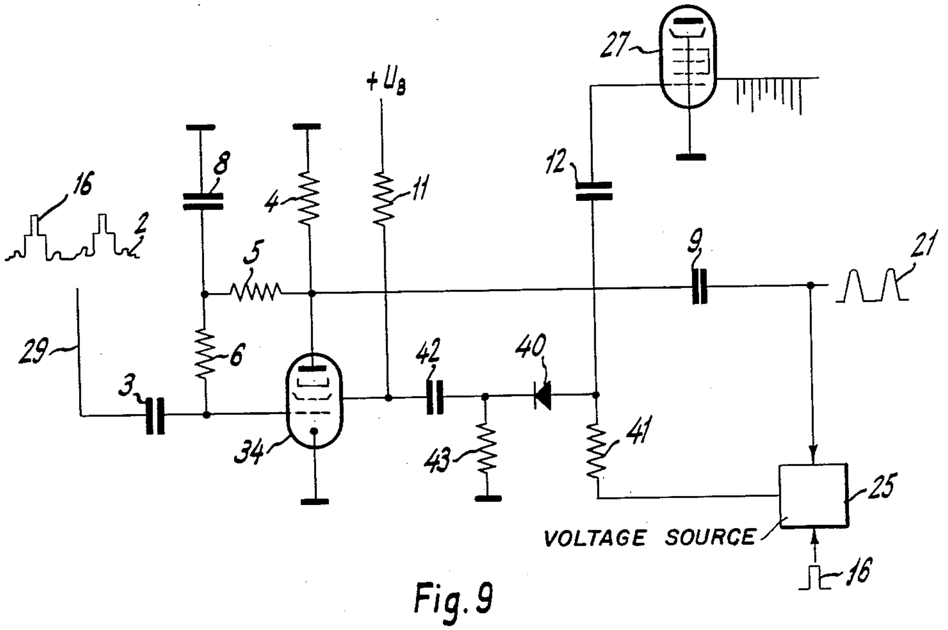
FIGURE 9 is a circuit diagram showing a modification of a portion of the circuit of FIGURE 8.

The invention as shown thus far can also be employed when the voltage at line 29 is fed to an electronic switch, FIGURE 9, such as a diode 40 connected between tubes 34 and 27 and not to the cathode of tube 34. Here, the circuit has to be dimensioned so that the switch 40 is open only for noise pulses when pulses 16 and 21 coincide, the coincidence circuit 25 determining this condition and biasing the diode 40 forwardly through a resistance 41, the condenser 42 and the resistor 43 maintaining the left end of the diode 40 at ground potential with respect to its quiescent D.C. value.

I claim:

1. A separator circuit for separating signal components exceeding a preselected modulation level from a combination signal including intelligence signals and synchronizing pulses at different modulation levels, the pulses serving to synchronize a local oscillator, said separator comprising a tube having electrodes including an anode, a cathode, a control grid means for applying said combination signals to said control grid, and a screen grid; a source of supply potential; a separator circuit output load resistor connected between said screen grid and the source; a feedback resistance chain connected between the control grid and ground and having a tap therebetween connected to the anode; coupling means connected between the anode and said local oscillator for applying a positive pulse to the anode and the control grid corresponding with each cycle of the oscillator, whereby each positive pulse renders the tube conductive and establishes a rectified negative bias on the control grid, said bias being determined by the amplitude of the positive pulses and the values of said resistance chain and the bias level being adjusted to said preselected modulations level.

2. In a separator as set forth in claim 1, said synchronizing pulses occupying a modulation level exceeding the level of the intelligence signals in said combination signal, and said resistance chain, having its values adjusted to produce a bias corresponding with the threshold level of said synchronizing pulses, whereby the screen grid current through said output load resistor is increased only during the presence of a synchronizing pulse at said control grid.

3. In a separator as set forth in claim 1, said combination signal having noise components exceeding the modulation level of said synchronizing pulses, and said resistance chain having its values adjusted to produce a bias corresponding with the peak level of said synchronizing pulses, whereby the screen grid current through said output load resistor is increased only by the presence of noise components at said control grid which exceed the level of said synchronizing pulses.

4. In combination, a noise separator as set forth in claim 3; synchronizing-pulse separator means also connected with said combination signal for separating said noise components and said synchronizing signals therefrom; and coupling means connected between said noise separator screen grid and said pulse separator means for applying the separated noise components to the latter to cancel out the noise components from the output of the pulse separator means.

5. In a combination as set forth in claim 4, pulse coincidence means having inputs respectively connected to said pulse separator and to said local oscillator to deliver gate signals when the synchronizing pulses are in step with the oscillator positive pulses; and means for connecting said gate signal to an electrode of the noise separator to bias the latter operative only when a gate signal is delivered, whereby the noise separator is inoperative when the oscillator falls out of synchronism.

6. In a combination as set forth in claim 4, pulse coincidence means having inputs respectively connected to said pulse separator and to said local oscillator to deliver gate signals when the synchronizing pulses are in step with the oscillator positive pulses; and electronic switch means connecting the noise separator with the synchronizing-pulse separator means and connected to receive said gate signals and be rendered conductive thereby, whereby the noise separator is coupled with the pulse separator only when the local oscillator is synchronized with said pulses.

7. In a combination as set forth in claim 4, transformer means connected with said combination signal and having a winding connected with said noise separator between the control grid and the resistance chain;

a capacitor connected between the junction of the winding with the chain and ground; and direct current amplifier means connected with the junction and delivering an automatic-volume-control signal proportional to the bias level on said grid.

References Cited in the file of this patent

UNITED STATES PATENTS

| | | |
|---|---|---|
| 2,632,802 | Vilkomerson | Mar. 24, 1953 |
| 2,797,259 | Thomas | June 25, 1957 |